United States Patent [19]

Lautenschläger, Jr.

[11] Patent Number: 4,509,882
[45] Date of Patent: Apr. 9, 1985

[54] JOINT FASTENER FOR THE ASSEMBLY OF MOLDINGS

[75] Inventor: Karl Lautenschläger, Jr., Reinheim, Fed. Rep. of Germany

[73] Assignee: Karl Lautenschlager KG Mobelbeschlagfabrik, Reinheim, Fed. Rep. of Germany

[21] Appl. No.: 537,827

[22] Filed: Sep. 30, 1983

[30] Foreign Application Priority Data

Oct. 4, 1982 [DE] Fed. Rep. of Germany ....... 3236719

[51] Int. Cl.³ .............................................. F16B 7/00
[52] U.S. Cl. ................................... 403/402; 403/323; 403/231
[58] Field of Search .............. 403/401, 402, 407, 323, 403/245, 231, 403

[56] References Cited

U.S. PATENT DOCUMENTS 3,099,051 7/1963 Chenoweth ........................ 403/402
3,425,721 2/1969 Agee ................................ 403/401 X
4,325,649 4/1982 Rock ............................... 403/407 X

FOREIGN PATENT DOCUMENTS 932765 12/1947 France ............................. 403/401

Primary Examiner—Andrew V. Kundrat

[57] ABSTRACT

A clamping fastener (12) having two substantially cylindrical insert bodies (18, 20) each having a flat extending parallel to the central axis of the cylindrical body. The cylindrical bodies are respectively insertable into a complementary recess (16) provided in the moldings (10) to be connected and cutting through the meeting surface of the respective molding. A coupling bar (26) protruding from the flat of one insert body (20) protrudes into an opening (28) in the flat of the other insert body (18). The coupling bar is adapted to be pulled into the opening (28) by an eccentric fastening device in such a way that the meeting surfaces (14) of the moldings (10) to be connected, are pulled towards each other and are tightened.

16 Claims, 9 Drawing Figures

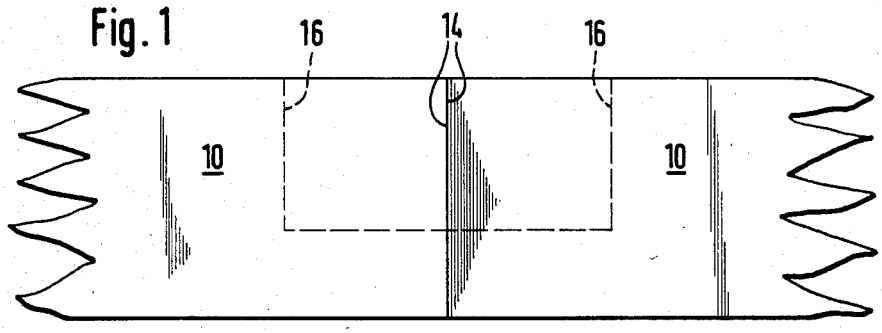
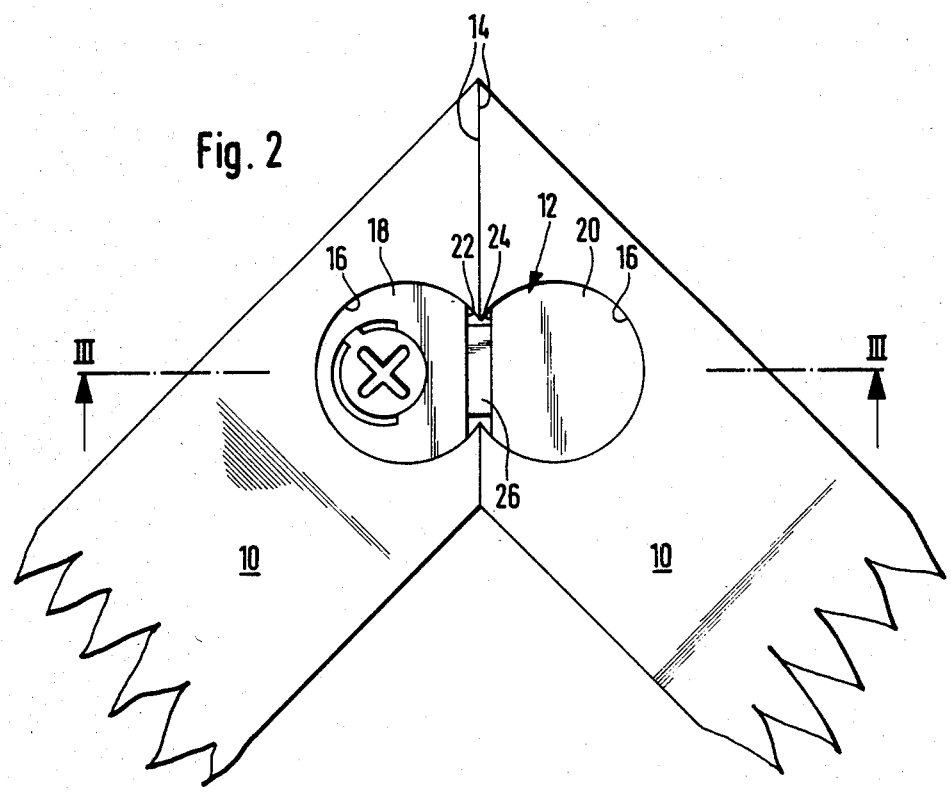

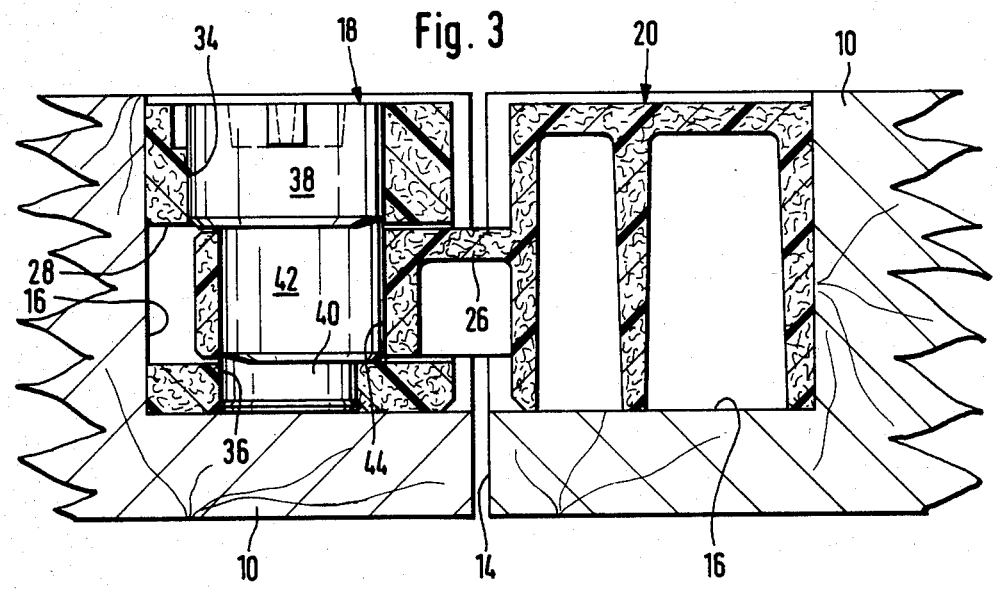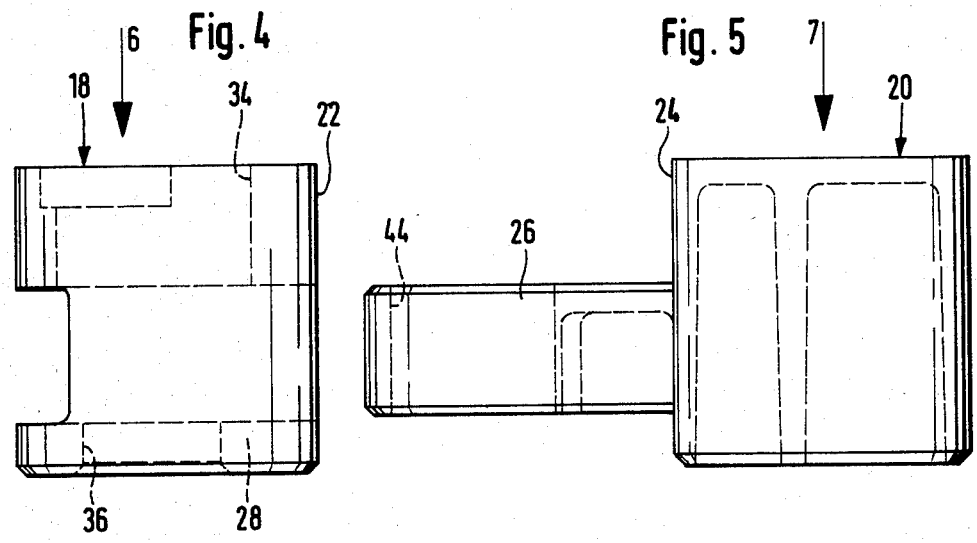

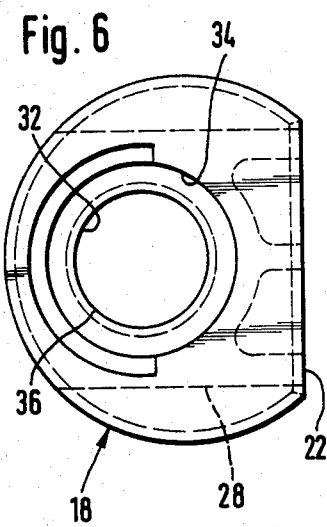
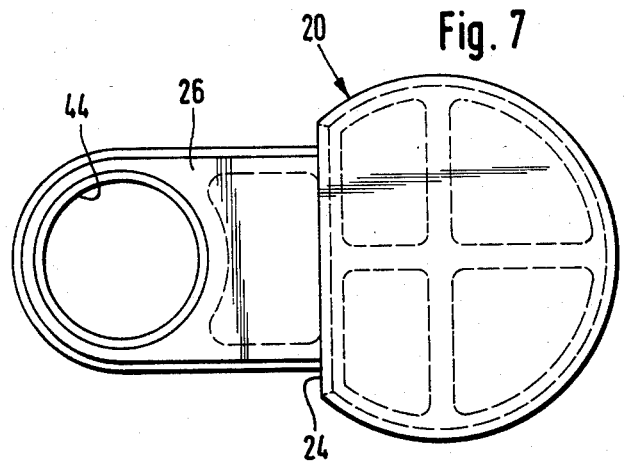
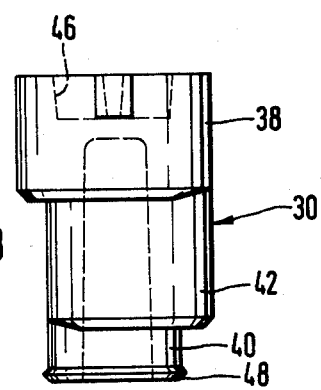
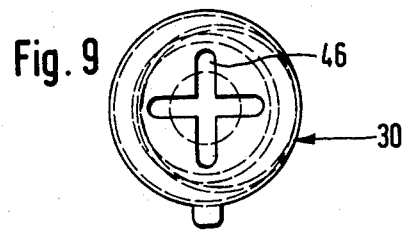

JOINT FASTENER FOR THE ASSEMBLY OF MOLDINGS

BACKGROUND OF THE INVENTION

The invention relates to a joint fastener for the assembly of moldings, especially for assembling cornices on furniture, consisting of two plug-like fastening elements which can be inserted each in a mortise in one of the moldings to be joined, and a tightening means whereby the fastening elements can be drawn against one another or apart, and it relates also to the assemblage which can be produced using such joint fastener.

As the result of changing attitudes in residential decorating, there has recently been an increasing demand for furniture stylistically reminiscent of furniture of times past. Consequently, cabinets are increasingly being manufactured whose door openings are framed in projecting or receding moldings fastened to the cabinet carcass, or which bear a frieze-like termination at their top or bottom horizontal edges, consisting of what are known as cornice moldings. At the points at which such moldings meet end to end—at a corner of a cabinet, for example—miter joints are formed at which the moldings are cut at 45° angles and they must be accurately joined at the cuts and fastened together. Heretofore the moldings have been glued together at the joined surfaces, requiring, as a rule, mortising or feathering besides. The preparation of such glued miter joints is time-consuming on account of the need for setting the glue, and also requires much labor. Moreover, once the glue has set the moldings can no longer be taken apart without damage if, for example, it develops that an already-glued molding frame has to be reworked for precise fitting to a cabinet carcass.

A joint fastener for joining together the frame elements of door or window frames meeting at right angles is known (U.S. Pat. No. 3,099,051); in this fastener, two pins disposed at each end of two arms pivoted together can be set in associated holes in the moldings to be joined, and the arms can then be drawn together by a screw. The arms and the screw are therefore on the top side of the frame members being joined together, which excludes the use of this fastener for the moldings of friezes or cornices, particularly on low cabinets, because such visible elements of construction impair the physical appearance of a cabinet.

The object of the invention is to create a joint fastener appropriate for the releasable joining of moldings, especially cornice moldings, which will be of simple construction and will permit the easy and rapid clamping together of moldings, in such a manner that, in the assembled state, no parts of the joint fastener will project above the surface of the moldings.

SUMMARY OF THE INVENTION

Setting out from a joint fastener of the kind described above, this problem is solved by the invention, according to which the fastening elements each have the external form of a substantially cylindrical plug having a flat running parallel to the axis of the cylinder. At least one of the plugs has a cavity extending at right angles from the flat, radially into the plug, This cavity is matingly engaged by a coupler bar projecting at right angles from the flat on the other plug. The plug provided with the radial cavity also has a bore parallel to its axis, the bore being open at at least one of its end faces and extending into the cavity. A bore in the free end of the coupler bar can be aligned with the bore in the plug, and a turn pin is journaled in the bores in the plug and coupler bar, and the section of the turn pin which is engaged in the bore in the coupler bar is offset eccentrically from the section that is journaled in the bore of the plug. The plugs which can be inserted into the bores made in the moldings directly adjacent to the abutting surfaces so as to be completely sunken therein, can therefore be drawn together by the coupler bars by rotating the turn pin, and can also be loosened again, the amount of movement depending on the amount of excentric offset of the cam sections journaled in the bore in the coupler bar and the bore in the plug.

The radial cavity can best extend all the way through the plug, thereby making available a sufficiently great tightening movement, as well as a saving of weight. Furthermore, a through cavity, i.e., one open at both ends, offers advantages of ease in manufacture.

For the same reasons it is also recommended for the bore in the plug receiving the turn pin to be a through-bore, so that the turn pin will be accessible from both ends of the plug when the joint fastener is installed.

The portions of the bore in the plug that lie on opposite sides of the radial cavity have preferably a different diameter, in which case the sections of the turn pin which are journaled in the bore sections have a different diameter corresponding to the bore sections associated with them.

The eccentric section of the turn pin will then best have a diameter that is smaller than the larger plug bore section and larger than the smaller plug bore section, while the diameter of the bore in the coupler bar will correspond to the diameter of the eccentric section of the turn pin.

The amount of tightening movement, which is related to the excentricity of the turn pin sections, will be optimum when the diameter of the excentric section of the turn pin is equal to half of the larger plug bore section diameter plus half of the smaller plug bore section diameter.

To prevent the accidental escape of the turn pin from the bore in the plug body when the joint fastener is in the untightened state, it is recommendable to lock it in the body against axial displacement.

It is desirable to provide a means for the engagement of a tool in the end of the turn pin that is accessible in the mouth of the bore in the plug, such as for example a screwdriver slot, a cross slot, or an internal hexagonal socket, so that the turn pin can be rotated by means of a tool to produce the torque required for the production of the tightening force.

In a preferred embodiment of the invention, the coupler bar is fixedly disposed on one of the plug bodies, being preferably an integral part of the plug body, although it is possible also to make the coupler bar separately and fasten it in one of the plug bodies. It is even conceivable then to provide both of the plug bodies with a radial cavity and a turn pin. Owing to the possibility of then being able to tighten the coupler bar from both ends, the joint fastener thus constructed would have a tightening movement double that of the embodiment described previously.

To be able to make the joint fastener of the invention as economically as possible, it is desirable to make one or both of the plug bodies and/or the turn pin of plastic, making them preferably, especially in the case of large production runs, by the injection molding process.

The joint fastener will then be particularly strong if a fiber-reinforced plastic is used.

If it is desired to produce an assemblage of two moldings meeting preferably in one place at a miter angle using the joint fastener of the invention, the arrangement is made such that each of the moldings has directly adjacent the meeting surfaces a bore drilled or milled with a cylindrical tool at right angles into the back of the molding and having a diameter corresponding to the diameter of the associated plug of the joint fastener, the distance between the axis of the bore and the meeting surface being less than the radius of the bore, so that the bore breaks through the meeting surface and the distance between the axis of the bore and the associated meeting surface is slightly greater than the distance measured from the flat on the associated plug body to its central axis. Since the plugs and the corresponding bores are of complementary cylindrical shape, the plugs in the untightened state can be turned slightly in the bores, thus permitting a correct alignment of the meeting surfaces of the moldings that are to be joined together.

BRIEF DESCRIPTION OF THE DRAWINGS

The invention is further explained in the following description of an embodiment, in conjuction with the drawing, wherein:

FIGS. 1 and 2 present a front elevational view and a plan view, respectively, of an assemblage of two moldings meeting in one plane at a 45° miter joint, which is made by using a joint fastener in accordance with the invention, FIG. 3 is a cross section along line 3—3 of FIG. 2, FIG. 4 is a side view of one of the plug bodies of the joint fastener of the invention, FIG. 5 is a side view of the corresponding second plug body provided with an integral coupler bar, FIG. 6 is a top plan view seen in the direction of the arrow 6 of FIG. 4, FIG. 7 is a top plan view seen in the direction of the arrow 7 of FIG. 5, and FIGS. 8 and 9 are a side view and top view, respectively, of the turn pin of the joint fastener.

DETAILED DESCRIPTION OF PREFERRED EMBODIMENTS

FIGS. 1 and 2 present a diagrammatic view of the joining at right angles of two moldings 10 by a joint fastener 12 of the invention, the moldings being shown, for the sake of simplicity, as plain sticks of rectangular cross section. When used as cornice moldings in furniture construction, the moldings often have a cross-sectional shape that differs from the rectangular cross-sectional shape. At the ends that are to be joined together, the moldings are miter-cut, i.e., the end surfaces 14 which are tightened together in the assembled state by the joint fastener 12 are at an angle to their longitudinal sides which is equal to half of the angle at which the moldings are to be joined together. Since the moldings in the present case are joined at a right angle, the abutting surfaces 14 of the moldings 10 are cut at an angle of 45°. Adjacent the abutting surfaces 14 a socket 16 is milled into the reverse side of each molding by means of an end milling tool, such that this socket, which is cylindrical in accordance with the shape of the end mill, breaks through at the abutting surfaces 14, and the sockets in the two moldings thus communicate with one another when the surfaces abut against one another.

The joint fastener 20 has two plug bodies 18 and 20 made, in the present case, of fiber-reinforced plastic by the injection molding process, their external form and dimensions corresponding substantially to the shape of the corresponding socket 16, i.e., the plugs have the basic shape of a cylindrical body whose cylindrical circumference, however, does not cover 360°, but is provided with a flat 22, 24, running parallel to the central axis. The plugs 18 and 20 can therefore be inserted matingly into the corresponding socket 16 in the back of the moldings, and can be drawn together by means of a coupler bar 26 molded in one piece with the plug 20 and projecting at right angles from the flat 24 thereof. This coupler bar 26 engages matingly in a cavity 28 extending all the way through the plug body 18, and is held in the latter by a turn pin 30 (FIGS. 8 and 9) which is mounted for rotation in a through bore 32 provided parallel to the central axis of the cylinder of the plug body. The bore 32 has in its portion above the cavity 28 a section 34 of larger diameter, and in its portion below the cavity 28 it has a section 36 of smaller diameter, and accordingly the sections 38 and 40 of the turn pin 30, journaled in the bore sections 34 and 36, respectively, are of different diameters. The turn pin section 42 situated between the journal sections 38 and 40 has a diameter of a size between the diameter sizes of the journal sections 38 and 40, and it is furthermore offset excentrically from the journal sections 38 and 40. This excentric turn pin section 42 fits matingly into a bore 44 in the free end of the coupler bar 26. When the turn pin 30 is rotated, the position of the excentric section 42 of the turn pin within the cavity 28 of the plug 18 changes, and the coupler 26 is displaced accordingly. Depending on the starting position of the excentric section 42 and the direction of rotation of the turn pin, the insert body 20 is drawn by the coupler 26 toward the insert body 18 or away from it. At the same time the ends of the moldings 10 in whose recesses 16 the plug bodies 18 and 20 are disposed are pulled together such that the abutting surfaces 40 are tightened against one another.

To permit the turn pin 30 to be rotated as required for tightening the joint fastener, a cross slot is provided in its end face which is accessible at the mouth of the plug bore 32. The tip of a cross-slot screwdriver can be inserted into this cross slot, enabling the turn pin to be turned with sufficient force to tighten the joint fastener. At the opposite end of the turn pin, the section 40 of the pin is provided with a circumferential bead 48 whose outside diameter is slightly larger than the inside diameter of section 36 of bore 32, and thus serves, with a circumferential chamfer at the bottom of bore portion 36, as a snap fastener to prevent the turn pin from slipping out of the bore. Since the turn pin 30, like the plug bodies 18 and 20, is made of plastic, the resilience of the turn pin 30 and of plug insert body 18 in the area of bore section 36 will suffice to permit the bead 48 to be forced through the bore section 36 when assembling the joint fastener 12.

It can be seen that modifications and further developments of the above-described joint fastener 12 can be made within the framework of the invention. For example, it is conceivable that the coupler bar 26 may not be made integral with the plug body 20, but can be made as a separate piece and then be fastened appropriately to or in the plug body 20. The plug body 20 can then be of a configuration corresponding to the above-described plug body 18, and a bore corresponding to bore 44 is then provided in the other end of the coupler bar so that the latter can be fastened in the plug body by means of a pin. This pin can then be provided with an excentric section corresponding to that of the turn pin 30, thus doubling the amount of tightening movement that is available. If this greater length is not necessary, the pin can also be in the form of a simple, non-rotatable pin without an excentric portion. It is preferable for the parts of the joint fastener to be made of fiber-reinforced plastic in the manner described, but all of the parts, or only a few of them, such as the coupler bars and/or the turn pin, can be made of metal if this is required for reasons of greater strength or for a dimensional reduction for use with small-size moldings.

I claim:

1. A clamping fastener for moldings, especially for cornice moldings on furniture, comprising: two plug-like fastening elements respectively insertable into two recesses in two moldings to be joined, means for respectively drawing said fastening elements together or apart, said fastening elements each having the external shape of a substantially cylindrical insert body provided on one side with a flat running parallel to the center axis of the cylindrical insert body, at least one of said insert bodies having an opening extending radially into said one insert body substantially at right angles from its flat, a coupling bar projecting substantially at right angles from the flat of the other insert body and matingly engaging said opening, said one insert body having a first bore with an axis which runs parallel to said central axis, said first bore opening into at least one of the end faces of said one cylindrical insert body, said coupling bar having a second bore adapted to be aligned with said first bore, and a turn pin having sections journaled in said two bores, said section in said second bore in the coupling bar being offset excentrically from said section journaled in said first bore in said one insert body.

2. A clamping fastener according to claim 1, wherein said radial opening passes all the way through said one insert body.

3. A clamping fastener according to claim 1, wherein said first bore passes all the way through said one insert body.

4. A clamping fastener according to claim 3, wherein said first bore has two portions situated on opposite sides of said radial opening, said two portions having different diameters, said sections of said turn pin journaled in said bore portions having a diameter corresponding to the respective bore portion.

5. A clamping fastener according to claim 4, wherein said eccentric section of said turn pin located in said second bore in the coupling bar is provided between the turn pin sections associated with the bore portions of different diameter in said one insert body, has a diameter which is smaller than the larger insert body bore portion and larger than the smaller insert body bore portion, and wherein the diameter of the second bore in the coupling bar is the same as the diameter of the eccentric turn pin section.

6. A clamping fastener according to claim 5, wherein the diameter of the eccentric turn pin section is equal to half the diameter of the larger insert body bore portion plus half the diameter of the smaller insert body bore portion.

7. A clamping fastener according to claim 1, wherein said turn pin is snap-fastened against axial escape from said first bore.

8. A clamping fastener according to claim 1, wherein said turn pin has a tool engaging recess in a face which is accessible.

9. A clamping fastener according to claim 1, wherein said coupling bar is fixedly disposed on one of said insert bodies.

10. A clamping fastener according to claim 9, wherein said coupling bar is an integral part of said one insert body.

11. A clamping fastener according to claim 1, wherein at least one of said insert bodies is made of plastic.

12. A clamping fastener according to claim 1, wherein said turn pin is made of plastic.

13. A clamping fastener according to claim 1, wherein at least one of said insert bodies and said turn pin are made of plastic.

14. A clamping fastener according to any one of claims 11 to 13, wherein said plastic is an injection molded plastic.

15. A clamping fastener according to any one of claims 11 to 13, wherein said plastic is a fiber-reinforced plastic.

16. In combination: two moldings meeting in one plane at a miter angle, said moldings each having meeting surfaces and adjacent thereto one recess and together defining two recesses each extending parallel to the respective meeting surface from a defining surface of the respective molding at right angles to the respective meeting surface, two plug-like fastening elements respectively insertable into said two recesses, means for respectively drawing the fastening elements together or apart, said fastening elements each having the external shape of a substantially cylindrical insert body provided on one side with a flat running parallel to the central axis of the cylindrical insert body, at least one of said insert bodies having an opening extending radially into said one insert body substantially at right angles from its flat, a coupling bar projecting substantially at right angles from the flat of the other insert body and matingly engaging said opening, said one insert body having a first bore with an axis which runs parallel to said central axis, said first bore opening into at least one of the end faces of said one cylindrical insert body, said coupling bar having a second bore adapted to be aligned with said first bore, and a turn pin having sections journaled in said two bores, said section in said second bore in the coupling bar being offset eccentrically from said section journaled in said first bore in said one insert body, each recess having a diameter corresponding to the diameter of the associated insert body of the fastening element, the distance of an imaginary longitudinal central axis of the recess from the associated meeting surface being smaller than half of the recess diameter, so that the recess breaks through the meeting surface, and the distance of the longitudinal central axis of the recess from the associated meeting surface being slightly greater than the distance measured from the flat of the associated insert body to its respective cylinder central axis.

* * * * *